March 13, 1951     J. C. RICHARDSON     2,545,168
PIPE CONNECTOR
Filed Oct. 7, 1948
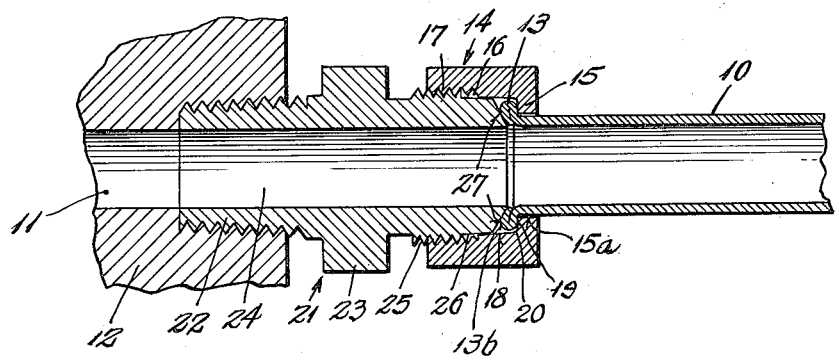
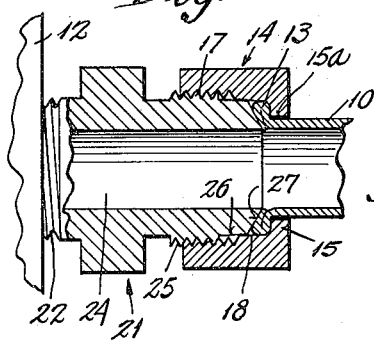
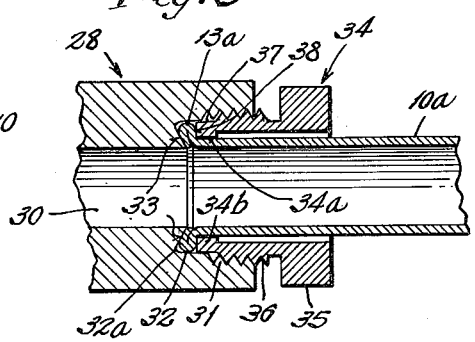
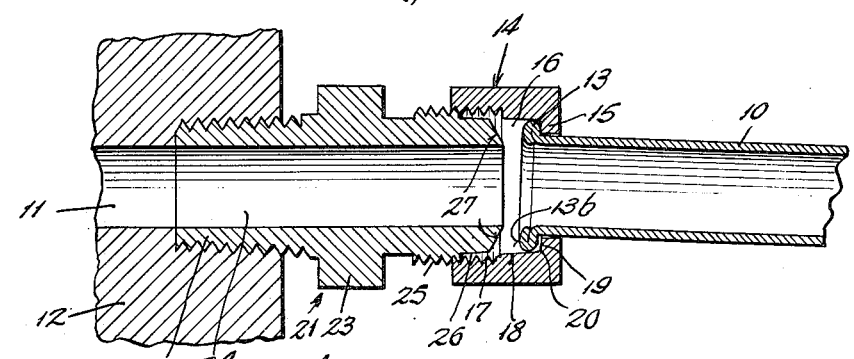
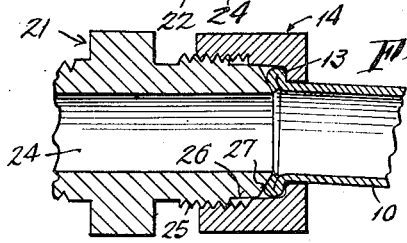
INVENTOR.
James C. Richardson
BY
Johnson and Kline
ATTORNEYS Patented Mar. 13, 1951

2,545,168

UNITED STATES PATENT OFFICE 2,545,168

PIPE CONNECTOR

James C. Richardson, Waterbury, Conn., assignor to The Brockway Company, Naugatuck, Conn., a corporation of Connecticut Application October 7, 1948, Serial No. 53,319

3 Claims. (Cl. 285—86)

This invention relates to coupling or connecting means for threadless pipe, tubing, conduit and the like, for connecting the same to other or similar structure in such manner as to obtain a leak-tight connection. Specifically, the invention relates to the type of coupling shown in my previously filed application, Serial No. 716,370, filed December 14, 1946, now Patent No. 2,522,194.

As pointed out in my said application, the need for convenient and satisfactory means for connecting ductile or bendable threadless pipe or tubing, e. g., of metals, such as aluminum, copper, lead, tin, zinc, iron, and alloys of these metals, as well as of ductile plastic materials, to pipe lines or to orifices of structures such as engines, machines and commercial or household fixtures, has been of long standing; one field of application for such connections lying in the use of bendable threadless pipe for connecting household fixtures, such as gas ranges and washing machines, which are to be semi-permanently installed, to existing pipe lines carrying gas, water and the like. Another field of application is in the automotive industry for connecting gasoline lines to carburetors, overflow lines to radiator fittings, etc.

Numerous proposals have been made in an attempt to satisfy this need. Most of these proposals involved coupling means for gripping portions of the pipe walls, or clamping deformed portions thereof between opposed coupling member surfaces. Many of the couplings heretofore known were subject to disadvantages which impair their utility, or render their use unduly expensive or inconvenient. For example, in installations in which the coupling is subjected to axial or lateral stress, or to vibration, the connection tends to fail by gradual deformation of the portions of the pipe engaged by the coupling. Parts of the pipe subjected to the clamping or gripping action of the coupling members are often weakened thereby, rendering the pipe easily susceptible to fracture. Some of the coupling means form constrictions or widened portions in the passage extending through the coupling, offering resistance to the flow of fluids therethrough; and often junctions of several of the coupling members are exposed to fluids in the pipe, so that special precautions must be taken to avoid corrosion, particularly from electrolytic action when the junction is between dissimilar metals. Some of the couplings hereinbefore proposed require a large number of parts, whereby they are relatively expensive to manufacture, and inconvenient to assemble. Furthermore, unless the coupling parts can be preassembled with the pipe, there is danger of losing one or more of the parts before the coupling is installed, thereby rendering the coupling useless. Most couplings require a relatively large number of threaded parts thereof to make up the connection, constituting a considerable inconvenience, particularly in mass production. Furthermore, constructions heretofore known are obten subject to the disadvantage that excessive force applied in making up the connection tends to weaken the pipe, while too little force fails to form a sufficiently tight joint.

A disadvantage in known couplings such, for example, as tube fittings is the necessity of lining up the tubing exactly with the opening of the fitting, in order to avoid the possibility of crossed threads in starting the associated coupling nut onto the threaded body of the fitting. It is also necessary to provide substantial accuracy in the concentricity of the sealing surfaces relative to the tubing in order to insure a sufficiently tight connection to avoid "weeping." In the present invention these defects are overcome.

Also, as a result of this invention, a fitting of a given standard size has such reduced overall dimensions as result in a very substantial saving of material, with corresponding lowering of cost.

In accordance with the invention as set forth in my said application, coupling means are provided for threadless ductile pipe, tubing, conduit or other hollow tubular structures, hereinafter referred to as pipe, wherein only two interchangeable coupling parts are required to secure the pipe in leak-tight engagement with another structure. These parts can be preassembled with the pipe, until used, so that loss of the parts is readily avoided. The coupling is adapted to form a passageway of uniform diameter through the pipe and coupling, offering minimum resistance to the flow of fluids therethrough; and only one junction between metal parts is necessarily exposed to the fluid in the pipe, so that corrosion problems presented by dissimilar metal junctions can be readily overcome. The parts of my coupling are simple in design, and can be readily economically made by mass production methods. The deformed portion of the pipe wall engaged by the coupling members is formed in such a manner as to minimize weakening of the pipe material, and the coupling members are arranged to clamp the pipe in such a manner as to avoid any tendency to weaken the parts of the pipe engaged thereby. In consequence thereof, the force applied in making up the connection is not critical, and the coupling can be tightened with full force to insure a leak-tight connection.

The present invention is designed to permit initiating the coupling operation between the associated coupling members, or between a coupling member and a fitting, even when the pipe is out of alignment therewith, thus simplifying the assembly of the parts especially in confined or cramped locations such as are frequently encountered, for example, in automotive assembly operations. In the case of threaded coupling members, the threaded connection can be initiated with the pipe out of alignment without danger of crossed threads. This is accomplished by so constructing and arranging the coupling member, which may be a coupling nut, as to permit axial misalignment of the pipe and member in the preliminary makeup of the coupling while insuring a leak-tight contact of the coupling members with the pipe flange and rigid holding of all parts after makeup. At the same time the present design permits such radial flexibility in positioning the parts as to provide a leak-tight connection even with considerable eccentricity between the sealing surfaces and the pipe axis. A connection that will not "weep" can be obtained by finger tightening followed by a short turn with a wrench. The resulting advantages in automotive assembly operations, for example, are incalculable.

The present invention is also designed to provide a coupling of the type set forth of such construction and arrangement that only one pipe flange-engaging surface is required to be accurately fitted to clamp the flange with a leak-tight engagement, with the result that manufacturing tolerances of the remaining parts are increased and the cost of manufacture and time required for production correspondingly reduced.

In accordance with my invention, I provide on or adjacent the end of the pipe an upset double-thickness flange, formed from the walls of the pipe, and extending substantially in radial direction from the pipe. The upset flange can be made, as disclosed in my copending application, Serial No. 702,026, of October 8, 1946, by subjecting an unconfined short length of the pipe, at or adjacent the end thereof to compression in axial direction, while confining adjacent portions of the pipe against expansion. In accordance with this invention the compressing operation is performed on the end portion of the pipe. The unconfined portion of the pipe when subjected to compression, bulges outward to form a ridge or bead, and the two sides of the latter are then forced together to form a double-thickness substantially radial flange. Since the pipe wall upset by such compression is unconfined the metal of the pipe flexes or flows to form the flange in its most natural manner, thus avoiding substantial thinning or weakening of the metal. At the base of the flange the metal is somewhat thickened and strengthened under the influence of the compression.

The upset flange is then clamped between a pair of coupling members, including draft means, such as interengaging threaded portions, whereby the coupling members can be forced togethter in axial direction of the pipe against opposite sides of the upset flange. The coupling members have telescoping portions adjoining the flange-engaging surfaces thereof which cooperate therewith to form an annular chamber enclosing and substantially confining the flange. Thus, when the connection is made up and tightened with great force, the flange cannot become unduly deformed, and consequently weakened, by reason of the fact that the metal thereof is confined against substantial deformation by the walls of said annular space. The walls of said space are preferably constructed so as to diverge in radial direction, so as to prevent the material enclosed in the annular space from being forced inward toward the axis of the connection. Thus, the force applied in tightening the connection is not critical.

In the present invention, one of the coupling members is so mounted on the flanged pipe that makeup of the connection can be initiated with the pipe out of alignment with the coupling members, while the flange-engaging surfaces thereof are shaped as hereinafter described to accomplish the further purposes of the invention.

As illustrated, the coupling member which is preassembled with the flanged pipe has a pipe-receiving aperture of such form as to permit limited axial misalignment of the member and the pipe at the beginning of the coupling operation without interfering with the proper coupling operation, so that makeup of the coupling can be initiated without requiring the pipe to be in absolute axial alignment with the coupling members. The operation of connecting a pipe to a threaded fitting by means of a coupling nut, for example, can be initiated without aligning the pipe exactly with the fitting bore without danger of crossed threads. This is of particular advantage in assembly line operations, such as in the automotive industry, as it permits a coupling nut to be started onto the body of a fitting, such as a carburetor fitting, much more quickly and easily than has heretofore been the case.

Also, the coupling member which is preassembled with the flanged pipe has a substantially radial flange-engaging clamping surface and a pipe receiving aperture formed to cooperate with such surface and enable the coupling member to engage the pipe flange around 360° of contact even when some eccentricity is present between the coupling member and the pipe axis, while the clamping surface on the cooperating coupling member is so formed as to center the pipe flange thereon and engage it around 360° of contact with leak-tight engagement if the axis of the pipe is eccentric thereto. As a result, the present invention provides a leak-tight connection which will not "weep" even under conditions of eccentricity between the parts. This also results in easier manufacturing tolerances, reducing the time and cost of production and insuring a satisfactory connection under conditions which previously have prevented it.

Other features and advantages of my invention will appear from the following description of a number of preferred embodiments of my invention, illustrated in the accompanying drawings, wherein:

Figure 1 is an axial cross-sectional view of the parts of a coupling in accordance with my invention, after making up the joint under relatively light wrench pressure.

Fig. 2 is a similar view showing the effect of high wrench pressure on a similar joint.

Fig. 3 is a section of a modification of the coupling shown in Fig. 1.

Fig. 4 is a view similar to Fig. 1 showing how makeup of the coupling can be initiated with the parts out of proper alignment.

Fig. 5 is a similar view showing how the present invention can provide a leak-tight connection even when the associated tubing is out of alignment with the connected fitting or similar part.

Referring to Fig. 1, a piece of ductile pipe 10, to be connected to the mouth of a passage 11, in a structure 12, has double-walled upset flange 13, formed at the end of the pipe. The upset flange can be formed, for example, by the method disclosed in my copending application, Serial No. 702,026, of October 8, 1946, wherein the pipe is gripped by an encircling and confining die along a substantial length thereof, with an end portion of the pipe, of sufficient length to form an upset flange, protruding unconfined from the end of the die. The protruding end of the pipe is then subjected to compression in axial direction, for example, by supporting the end of the pipe against a compression member and forcing the die, together with the pipe enclosed therein, toward the compression member. The walls of the unconfined protruding end portion of the pipe bulge outward to form a bead, and the walls of the bead are then forced together to form a double-walled flange, extending substantially in radial direction from the pipe. The radial end surfaces 13b of the bead are usually rounded. To avoid reduction of the internal diameter of the pipe at the base of the upset flange, a mandrel may extend into the pipe from the open end thereof during application of compression thereto.

As shown in the drawing, the upset flange bearing pipe has a female coupling member 14, the exterior of which may be advantageously shaped to engage a wrench, for example, by making its surface hexagonal or square. The coupling member 14 encircles the pipe 10 behind the upset flange 13, and has a relatively narrow flange 15 at its rear end with a pipe encircling bore 15a of such diameter as to permit limited axial misalignment of the coupling member 14 on the pipe and also permit the coupling member to be off center relative to the pipe while still engaging the entire circular face of the upset flange 13. At its forward end, coupling member 14 has an enlarged cavity 16, of sufficient diameter to receive the flange. The outer portion of the cavity 16 is provided with internal threads 17. Extending inward from the threads 17 the cavity 16 has a wall 18 tapered inwardly at an angle of approximately 3° to the axis of the coupling member, with the inner, smaller end of the same of slightly larger diameter than the flange 13. The inner portion of the cavity terminates at a shoulder 19, which preferably joins the bore of the surface 18 at a slightly (i. e. of small radius) rounded corner 20. The inner flange engaging face of the shoulder 19 extends substantially radially.

The opposite coupling member of Figs. 1 and 2 is a body or fitting 21, having for example, a pipe-threaded portion 22 for engaging a correspondingly threaded orifice in the mouth of the passage 11 of structure 12, and advantageously includes a nut portion 23 of conventional hexagonal or square shape, for engaging a wrench. The body 21 has a bore 24, of a diameter corresponding to the internal diameter of the pipe 10, and preferably of the passage 11.

The opposite projecting end of the body 21 constitutes a male coupling member, adapted to cooperate with the female member 14. Thus, adjacent the projecting end, it is provided with external threads 25 for engaging the internal threads 17 of the member 14. Extending outward from the threads it has a substantially cylindrical portion 26 shaped to fit telescopically into the cylindrical portion 18 of the coupling member 14 and tapered at a corresponding angle. The end surface 27 of the body 21 is conically formed on an angle of about 30° to a radial plane, for engaging the outer rounded face 13b of the flange 13. This conical flange-engaging face 27 provides 360° contact with the pipe flange even under misalignment. Forming the conical end face on the fitting at the angle specified also permits die casting the fitting on the associated apparatus to which the fitting connects the pipe 10 such, for example, as a carburetor.

It will be apparent that the invention permits the threaded engagement of the coupling member 14 with the fitting 21 to be initiated without requiring the pipe 10 to be in exact alignment with the fitting or with the coupling nut without danger of crossed threads. As a result, makeup of the coupling can be initiated quickly and easily even when the pipe is not in exact alignment with the coupling members, see Figs. 4 and 5, a feature which is of particular advantage in assembly line operations, such as in the automotive industry. Beging conical, the surface 27 diverges slightly from a plane at right angles to the axis of the coupling, so that said surface and the shoulder 19 define an annular chamber for enclosing and confining the upset flange 13, the walls of said chamber diverging from each other in radial direction by a determinate angle.

It will also be apparent that the size of the aperture 15a in the coupling member 14 and the radial disposition of the flange-engaging face of the shoulder 19 permits the coupling member to engage the pipe flange around 360° of contact even when the pipe axis is eccentric to the coupling member and to the flange-engaging surface. Also, the conical flange-engaging face of the coupling member 21 serves to center the pipe flange on such face and engage the flange around 360° of contact even if eccentricity exists between the pipe and the coupling member 21. As a result, a tight joint can be made which will not "weep" even under conditions of eccentricity which render it impossible to obtain a leak-tight joint with present day couplings. This, in turn, reduces the manufacturing tolerances required in a coupling embodying the present invention, with corresponding reduction in costs and time of manufacture.

When the coupling is made up, the rounded face 13b of the upset flange 13 at the end of the pipe 10 is seated against the conical end 27 of the body 21, and female coupling member 14 is threaded onto the projecting end portion of the body until shoulder 19 at the base of the cavity 16 engages the rear side of the upset flange 13. When in this position the parts are usually drawn into alignment as shown in Fig. 1, in spite of any misalignment at the beginning of the connecting operation. At the same time the cylindrical portion 26 of the body 21 enters the cylindrical portion 18 of the cavity 16, thus substantially confining the flange 13 within an annular space formed by the conical end surface 27 of the body 21, and the shoulder 19 at the base of the cavity 16.

It sometimes occurs that the pipe 10 will be held rigidly in non-alignment. Even when this is so the present coupling will seat the flange 13 against the conical face 27 due to the 360° contact between the surfaces and the fact that the radial coupling flange 15 accommodates slight eccentricity between the parts, see Fig. 5.

Due to the divergence of the cavity walls, when the two members are further tightened, the shoulder 19 and surface 27 clamp against the opposite sides of the upset flange 13, and tend to force the metal of the latter outward in radial direction so that it will substantially fill the annular space. Because of the shape of the annular space with respect to the shape of the flange 13, only slight deformation occurs. Exceedingly great force applied in tightening the connection cannot injure the flange 13, nor the pipe, since the metal thereof is confined within the aforesaid annular space, while the slightly divergent walls of the annular space prevent inward flow of the material of the pipe or flange. Thus, the joint can be tightened to any desired extent without injury to the connection. An exceedingly tight joint can be formed in this way between the conical surface 27 of the body 21 and flange 13, which effectively prevents leakage between the two. The only junction exposed to fluids within the coupling is that between the body 21 and the flange 13, so that by making or lining the body 21 with the same metal as the pipe 10, electrolytic corrosion can be avoided.

The bore of the body 21 being the same as the internal diameter of the pipe, provides a passage through the coupling of uniform diameter, offering minimum resistance to passage of fluids through the connection. Since the relative movement of member 14 and body 21 from the point at which flange 13 is initially engaged by shoulder 19 and surface 27, to the point at which the joint is fully tightened, is very slight, the extent of the threads 17 and 25 may be reduced as far as consistent with the strength of the material of which the coupling members are made, so that a minimum number of turns is required for making up the connection.

The present invention results in reducing overall dimensions and a substantial saving of metal for fittings over what has heretofore been possible. For example, if the outside diameter of the pipe 10 is $\frac{5}{16}''$, or equal to .312, the outside diameter of the flange 13 will equal .382. With $\frac{3}{8}''$ tube having an outside diameter equal to .375, the O. D. of the pipe flange is equal to .445. If the tube O. D. is $\frac{5}{8}''$, which is equal to .625, the bead diameter is equal to .750. With a $1\frac{1}{2}''$ tube having an O. D. equal to 1.500, the bead diameter is equal to 1.700.

A modification of the connection of Figs. 1 and 2 is illustrated in Fig. 3. Essentially, the difference lies in the reversal of the male and female coupling members. Thus, in the construction of Fig. 3, the female coupling member 28 has a bore 30, corresponding in diameter to the internal diameter of the pipe 10a. The external surface of the member 28 is advantageously made hexagonal, or of any other conventional shape to engage a wrench. At its opposite end, the female member 28 has a cavity with internal threads 31, extending inward from its mouth, and a short inwardly tapered portion 32 extending inwardly from the threads, said tapered portion terminating at a conical face 33, similar to the conical end surface 27 of the body 21 of Figs. 1 and 2, and adapted to engage the end surface of the upset flange 13a at the end of the length of ductile pipe 10a. The tapered surface is joined to the conical face 33 by a rounded corner 32a of small radius.

A male member 34 is preassembled with the pipe and is provided with a pipe-receiving aperture 34a formed in a relatively narrow pipe-engaging flange 34b encircling the pipe behind flange 13a. The aperture 34a is sufficiently loose and the main bore of the coupling member is of sufficiently larger diameter than the aperture 34a to permit initiation of the threaded connection while the associated pipe 10a is not in alignment. The male member 34 has a nut portion 35 and external threads 36 for engaging the threads 31 of female member 28. The forward end of the member 34 has a tapered portion 37, adapted to enter and telescopically fit the tapered wall 32 at the inner end of the cavity of member 28. The leading end surface 38 of coupling member 34 is similar in shape to the shoulder 19 of Figs. 1 and 2.

Thus, the conical face 33 of female member 28, and the end surface 38 of male member 34, are adapted, when the two are threaded together to form an annular space to confine the flange 13a, said space having opposite walls diverging in radial direction.

In assembling the coupling of Fig. 3, pipe 10a is inserted into the cavity of female member 28 until it engages the conical surface 33 and male member 34 is then threaded into said cavity until its leading end surface 38 engages the rear side of flange 13a. When the members are in this position, as shown in Fig. 3, the tapered portion 37 of member 34 has entered the tapered portion 32 adjacent the base of the cavity of member 28 so as to confine the flange 13a within the annular space formed by the two members. When the coupling is then tightened, flange 13a is compressed and forced gently outward to fill said annular space, in which it is confined in the same manner as in the coupling shown in Figs. 1 and 2. The telescoping surfaces 32 and 37, like the corresponding surfaces 18 and 26 in Fig. 1, are formed on about a 3° angle to the coupling axis.

In each form illustrated, the only surface requiring accurate fitting and, therefore, relatively close tolerances in manufacturing is the conical flange-engaging surface against which the pipe flange is compressed into leak-tight engagement by the radial surface of the associated coupling member. This permits such tolerances in manufacturing the remaining parts as materially reduce the time of manufacture and the cost of production.

In each of the illustrated constructions, the double-walled flanges are formed in the preferred manner by upsetting the end portion of the pipe wall. If desired, however, the upset flange may be formed at a point spaced somewhat from the end of the pipe, the pipe end thereby projecting into the bore of the opposite coupling member. This, however, modifies the diameter of the passage through the coupling, and is accordingly used only where variations in the internal diameter are of no consequence.

The flange formed on the end of the pipe provides means whereby the coupling members can be preassembled therewith, so that the parts will not be lost prior to use of the coupling to form a connection. From time to time, the coupling can be dismantled after it has been made up, and then reinstalled without impairing the tightness of the joint formed thereby.

Variations and modifications may be made within the scope of the invention, and portions of the improvements may be used without others.

I claim:

1. A coupling comprising a length of ductile threadless pipe, having at the end thereof a double-thickness upset flange formed from the walls of the pipe, and extending in radial direction therefrom, a coupling member encircling the pipe behind said flange, and having a narrow flange with an oversized pipe-receiving bore and a flange-engaging surface abutting the rear surface of said upset flange; a second coupling member having threaded engagement with the first member operative to move said members relatively in axial direction, the oversized pipe-receiving bore permitting slight axial misalignment of the pipe and second coupling member; a bore in said second member coaxial with the bore of the pipe; and a conical flange-engaging surface on said second member abutting the front surface of said flange, said flange-engaging surfaces forming outwardly divergent walls adjacent the base of the upset flange and in said coupling members having portions adjacent the flange-engaging surfaces thereof in telescopic engagement so as to form with said flange-engaging surfaces a limited annular space for enclosing and confining said flange on the pipe, said members when threaded together clamping and confining said flange in leak-tight engagement therewith.

2. The invention as defined in claim 1 wherein the first coupling member has a pipe-receiving cavity therein and said narrow flange is located at the inner end thereof.

3. The invention as defined in claim 1 wherein the first coupling member has a pipe-receiving cavity therein and said narrow flange is located at the outer end thereof.

JAMES C. RICHARDSON.

REFERENCES CITED

The following references are of record in the file of this patent:

UNITED STATES PATENTS

| Number | Name | Date |
| --- | --- | --- |
| 1,752,508 | Schultis | Apr. 1, 1930 |
| 1,875,885 | Quarnstrom | Sept. 6, 1932 |
| 2,212,183 | Parker | Aug. 20, 1940 |
| 2,366,444 | Dorman | Jan. 2, 1945 |
| 2,415,472 | Dorman | Feb. 11, 1947 |

FOREIGN PATENTS

| Number | Country | Date |
| --- | --- | --- |
| 88,042 | Germany | Aug. 18, 1896 |